Oct. 11, 1932.  W. C. OCKER  1,882,087
FOG TRAINING DEVICE FOR AIRPLANES
Filed July 22, 1930
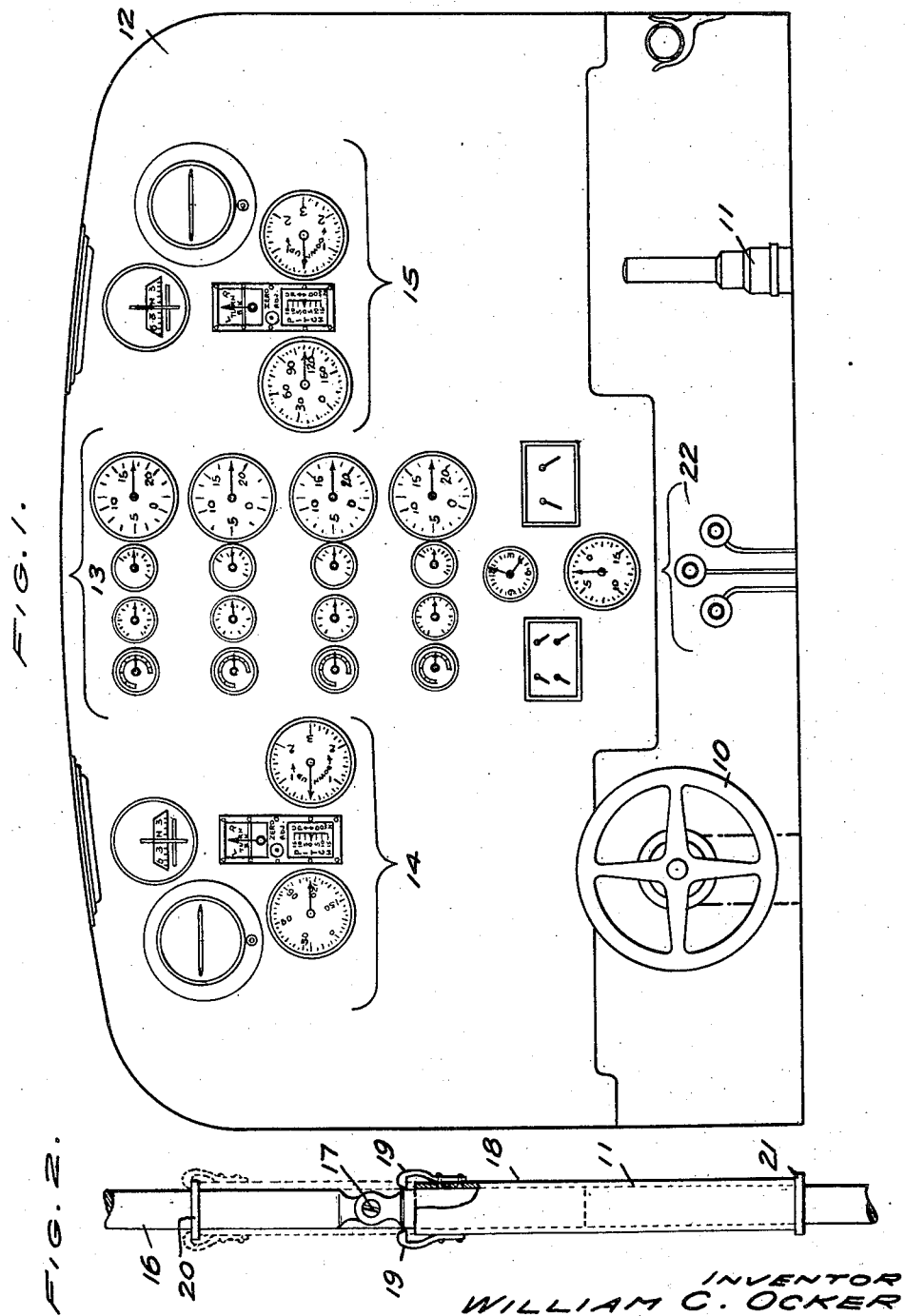
INVENTOR
WILLIAM C. OCKER
BY Robert H. Young
ATTORNEY Patented Oct. 11, 1932

1,882,087

UNITED STATES PATENT OFFICE

WILLIAM C. OCKER, OF SAN ANTONIO, TEXAS

FOG TRAINING DEVICE FOR AIRPLANES

Application filed July 22, 1930. Serial No. 469,723.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to control methods and apparatus particularly applicable to the instrument flying or fog flying of aircraft.

An object of the invention is to provide a method of instrument flying adapted to substantially diminish if not entirely eliminate the fatigue attendant upon long periods of instrument or fog flying and to this end contemplates the division of directional controls between two pilots so that one pilot will control a certain direction while the assistant pilot will control the other directions.

More specifically the method and apparatus in one embodiment of the invention provides for the division of flight controls coupled with the proper location of instruments for the two pilots that are operating the aircraft. The flight controls are so divided that one pilot will operate the aileron and rudder controls, while the other pilot through his controls will maintain proper air speed and altitude of the aircraft.

Experience in instrument or fog flying teaches that after a certain time the pilot operating the aircraft will become obsessed with a delusion that the aircraft is turning in one direction or another when the instruments definitely show that this is not the case, the instruments of course being correct. This delusion is the cause of great fatigue, and consequently division of the controls, as hereinafter described has been found to practically eliminate the responsibility and fatigue experienced by a single pilot.

In the accompanying specification and drawing the invention is described and illustrated as embodied in an aircraft of the transport type, it being of course understood that various modifications in the apparatus and steps of the method of operation may be resorted to within the scope of the appended claims without departing from the spirit or sacrificing any of the advantages of the invention.

In the accompanying drawing forming part of the specification;—Fig. 1 is a front elevation showing the instrument board and dual controls of a multi-motored aircraft;

Fig. 2 is a fragmentary detailed elevation showing the jointed control stick.

Referring now to the drawing in which like characters of reference designate similar parts in the various views, 10 designates a control wheel which is operatively connected to and operates the ailerons, rudder and elevators, the master pilot taking position behind this wheel. The assistant pilot takes position behind the control stick 11, which in the present embodiment of the invention is operatively connected to and operates the elevators but not the ailerons. The control stick, is therefore jointed, as best illustrated in Fig. 2 so that it will respond to movement longitudinally of the axis of the aircraft but not movement laterally of the aircraft until adjusted as will hereinafter be more fully explained.

The instrument board 12 is so arranged that both the master pilot and the assistant pilot are provided with a conveniently located set of flight instruments, each being a duplicate of the other. The numeral 13 designates four complete sets of engine instruments, each set indicating the condition of a respective engine. The numerals 14 and 15 designate the flight instruments or navigating instruments, each set being a duplicate of the other and disposed on opposite sides of the engine instruments. It will be particularly pointed out that all of the instruments are so positioned that the indicating needles thereof are disposed horizontally, that is, give a reading in a horizontal direction, when the aircraft is flying at cruising speed. The purpose of this specific positioning of the instruments is to enable the pilots to easily determine at a glance any deviation from the normal course. Obviously, should one or another of the needles point below or above the horizontal the corresponding motor factor or navigating factor can quickly be determined and the necessary adjustments made, thus easy control and reading of the instruments is greatly promoted. This easy reading of the instruments greatly reduces the fatigue of instrument flying. Obviously, the instruments may be initially so mounted that the above described horizontal reading of the needles will obtain under cruising conditions, or each instrument may be provided with adjusting means such as a knob or other device to re-locate any particular instrument, which may be found to be displaced due to conditions of service, so as to give a horizontal reading. With particular reference to the flight instruments or navigating instruments 14 and 15, with an increase of speed due to nosing down, all of the indicating needles in the three instruments will be depressed in a downward direction and thus may be easily read and the position of the ship readily corrected so that here again fatigue on the pilot is greatly diminished.

By referring now to Fig. 2, it will be seen that the control stick 11 is provided with a grip 16 which is pivoted as shown at 17 to the stick so that the stick will respond to movement in a direction longitudinally of the axis of the aircraft so as to operate the elevators but will not respond to movement laterally to operate the ailerons. However, to permit of the stick being moved laterally when desired a sleeve 18 is slidably mounted on the stick and is of such length to bridge the pivot 17 of the grip and couple the grip rigidly to the stick. The sleeve is provided at opposite points thereon with spring catches or hooks 19 which engage over a stationary collar 20 on the grip when the sleeve is slid upwardly and serve to lock the sleeve stationary at its upper limit of movement. In this position of the sleeve the grip is coupled for movement as a unit with the stick and may be moved either laterally or longitudinally of the axis of the aircraft to operate both the ailerons and the elevators in the usual manner.

A stop collar 21 is disposed on the stick to limit downward movement of the sleeve whereby to free the pivot of the grip 16 so that the latter will not operate the ailerons when the sleeve is at its lowest position of movement; any motion of the ailerons will not effect a sideways motion of the grip of the stick. Consequently it can be seen that when flying in conditions of fog it is the province of the assistant pilot merely to control the elevators or the up and down direction of the airplane.

The throttle controls 22, as will be seen by referring to Fig. 1, are located between the control wheel and the control stick within convenient reach of either pilot. It is the duty of the assistant pilot to operate these controls and thus maintain the flying speed of the aircraft, leaving the master pilot free to devote his attention to operating the ailerons and rudder.

By dividing the controls as above described it has been found that the usual great fatigue experienced by a single pilot while flying through fog is greatly diminished if not entirely eliminated.

I claim:

1. In aircraft dual control for instrument flying, a jointed control stick adapted to respond to movement longitudinally of the axis of the aircraft to control only the elevators, and means for establishing rigidity throughout the length of said control stick whereby the stick may be responsive to movement laterally of said axis to control the ailerons.

2. In aircraft dual control for instrument flying, a control stick, a grip pivoted to the stick and adapted to move the stick longitudinally of the axis of the aircraft and a sleeve on the stick movable to bridge the pivot of the grip and stick and permit of the stick being moved by the grip both longitudinally and laterally of said axis.

3. A divisional control device for aircraft comprising separate control means by which the direction of flight and lateral movements of the aircraft may be controlled by one pilot and the pitching movement controlled by a co-pilot, a set of navigation instruments confronting each of the separate control means, each set being a duplicate of the other, and engine gauge instruments between the duplicate sets of navigation instruments.

4. A divisional control device for aircraft comprising means operable by one pilot for providing directional and lateral control, means operable by a co-pilot for providing longitudinal control, an instrument board in the direct vision of both pilots, a plurality of aeronautical instruments in the direct vision of both pilots and including a set of flight instruments in the direct vision of each pilot, each set being a duplicate of the other, and a set of engine instruments between the said duplicate sets of flight instruments and at a focus point common to both pilots.

5. A device for diminishing fatigue attendant upon long periods of instrument flying which comprises the combination with a pilot's compartment of an aircraft of aeronautic instruments grouped to provide a relatively central set of engine gauge instruments bordered on each side by a set of navigating instruments, said sets of navigating instruments each being a duplicate of the other, dual controls including means opposite one set of duplicate instruments to enable a pilot to exercise directional and lateral control of the aircraft and means opposite the other set of duplicate instruments to enable a co-pilot to exercise longitudinal control, and throttle control means between the dual controls and within reach of either pilot.

6. A device for diminishing fatigue attendant upon long periods of instrument flying which comprises in an aircraft, an instrument board common to two pilots seated side by side and simultaneously piloting the aircraft by a division of flight controls, a separate set of navigating instruments for each pilot, each set being mounted on the said board in the direct line of vision of the pilot for individual reference, and a set of engine instruments mounted on said board ad centrally located with respect to the pilots for their joint and common reference.

7. A device for diminishing fatigue attendant upon long periods of instrument flying comprising divided navigational controls including means actuated by one pilot for operating certain of the controls and means actuated by a co-pilot for operating the remaining controls, and aircraft instruments grouped in a plane of vision common to both pilots and including engine instruments centered relatively to the pilots for their joint and common reference and navigational instruments on opposite sides of the engine instruments and in duplicate sets for their individual reference.

In testimony whereof I affix my signature.

WILLIAM C. OCKER.